May 20, 1958  A. E. R. ARNOT  2,835,361
CLUTCH TRANSMISSION MECHANISMS
Filed June 6, 1955  4 Sheets-Sheet 1

INVENTOR
ALFRED E.R. ARNOT
By Watson, Cole, Grindle & Watson
ATTORNEYS

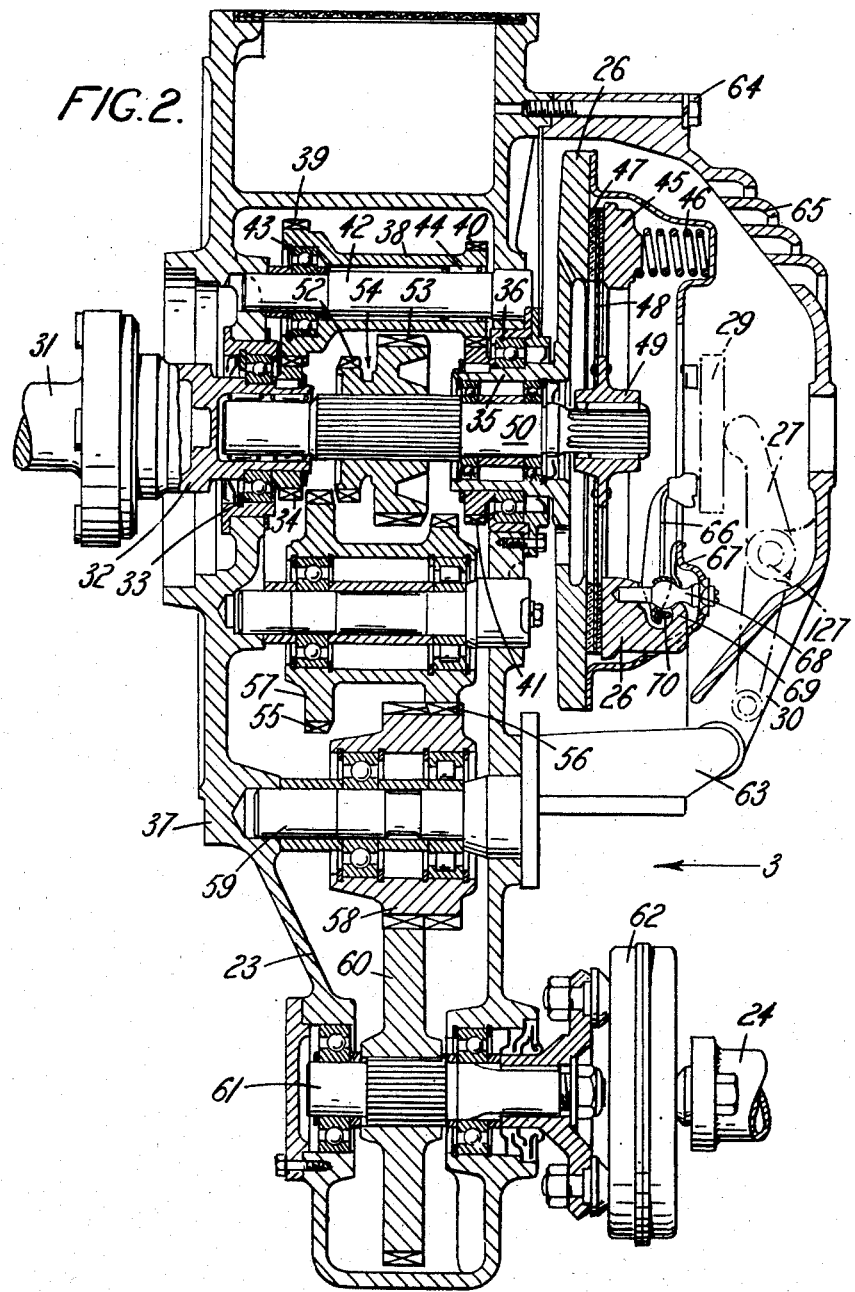

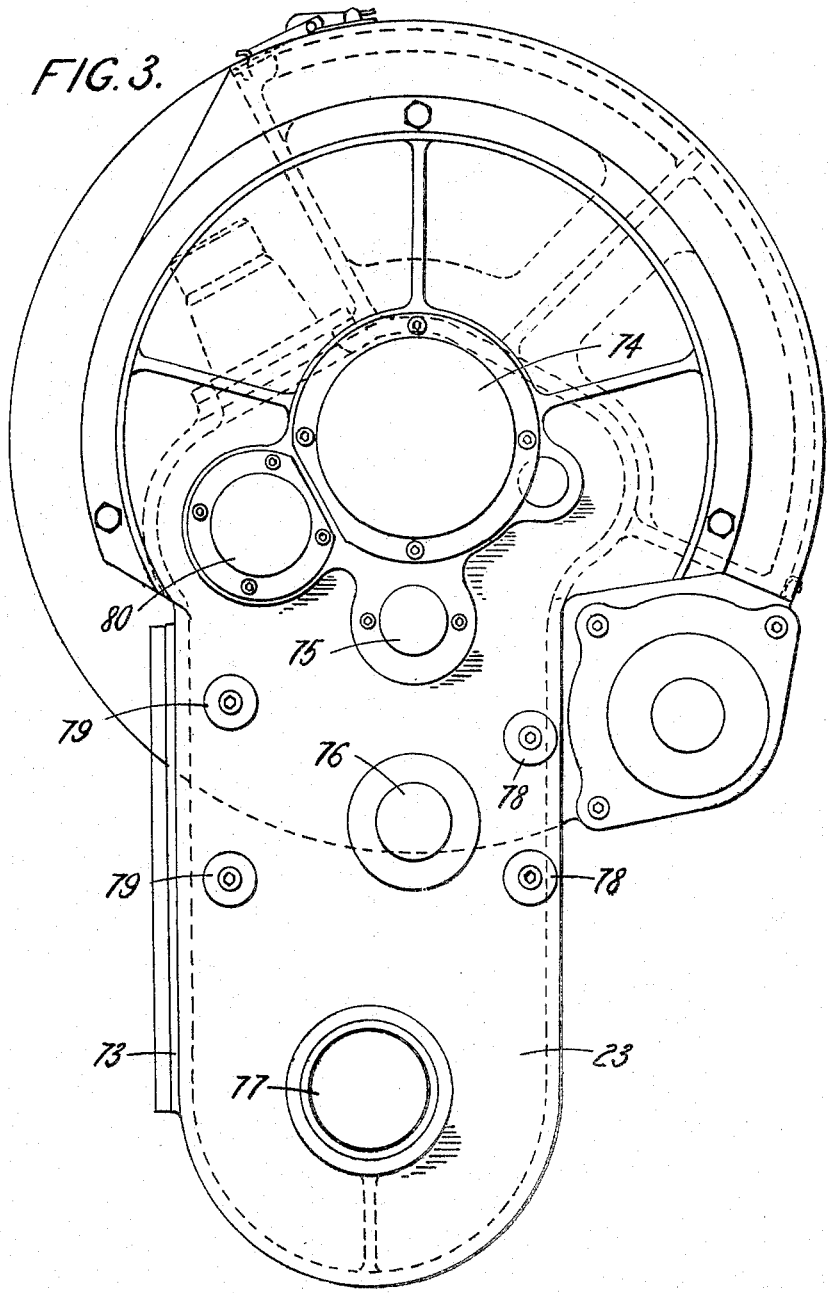

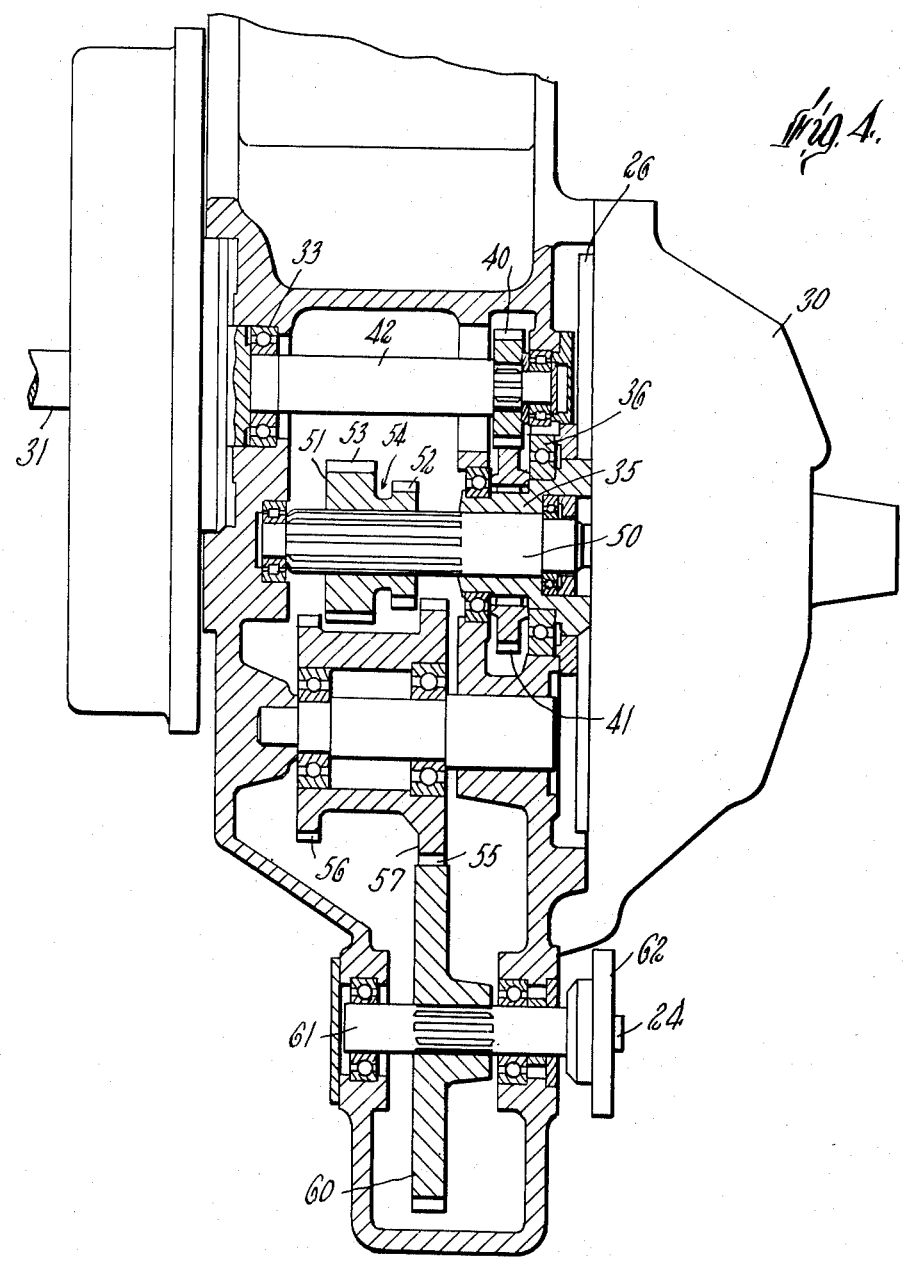

United States Patent Office 2,835,361
Patented May 20, 1958

2,835,361
CLUTCH TRANSMISSION MECHANISMS

Alfred Erwin Reginald Arnot, Basingstoke, England, assignor to Emmanuel Kaye and John Reginald Sharp, Basingstoke, England Application June 6, 1955, Serial No. 513,245

Claims priority, application Great Britain June 10, 1954

5 Claims. (Cl. 192—3.5)

This invention comprises improvements in or relating to clutch and transmission mechanisms of internal combustion engine operated vehicles. It is an object of the present invention to provide a construction of transmission gearing for use in an internal-combustion-engine-driven vehicle in which the clutch is particularly accessible and the clutch and gear box are conveniently located for operation of driving wheels of small diameter on a short chassis.

Such as assembly is frequently required in short goods-handling trucks which are used for running about in factory premises where a short wheel base is essential and the ordinary disposition of the parts, as in a motor car, with the clutch between the gear box and engine and a transmission shaft behind the gear box in line with the engine, is objectionable in such cases.

The present invention comprises a transmission assembly for a vehicle comprising a gear box, a clutch overhung from the gear box on one side, the clutch having rotatable driving and driven members, one mounted on a hollow quill supported by the gear box and the other mounted on a shaft which extends into the gear box inside the quill, an engine drive coupling on the opposite side of the gear box from the clutch, drive-means between said coupling and the driving member of the clutch, and gears in the gear box connecting the driven member of the clutch to a driven element located in the gear box on another axis from the engine and clutch axes. This arrangement enables the clutch to be readily accessible in front of the gear box and without any impediment from a transmission shaft. It also permits the clutch pedal and gear lever to be conveniently disposed for a driver seated close above the gear box and the driving wheels.

Most clutches consist of a heavy portion which comprises the outer member of the clutch and of a relatively light inner member. By mounting the heavy portion on the quill and the light portion on the shaft which extends inside the quill, the maximum of convenience in the arrangement of the mechanical parts is achieved. Preferably, the quill is a relatively short member, the shaft which extends inside the quill and which is connected to the lighter element of the clutch enters the gear box and is directly connected to the gears therein and the quill is driven from the engine through a lay shaft. It is found that with such an arrangement it is more convenient to control the gear changing operation.

The following is a description by way of example of one construction in accordance with the invention, reference being made to the accompanying drawings in which:

Figure 2 is a vertical section through engine clutch and gear box;

Figure 3 is an end elevation of the gear box casing looking in the direction of the arrow 3 in Figure 2, with the clutch and clutch cover removed; and Figure 4 is a vertical section through a modification of the transmission mechanism.

Figure 1:
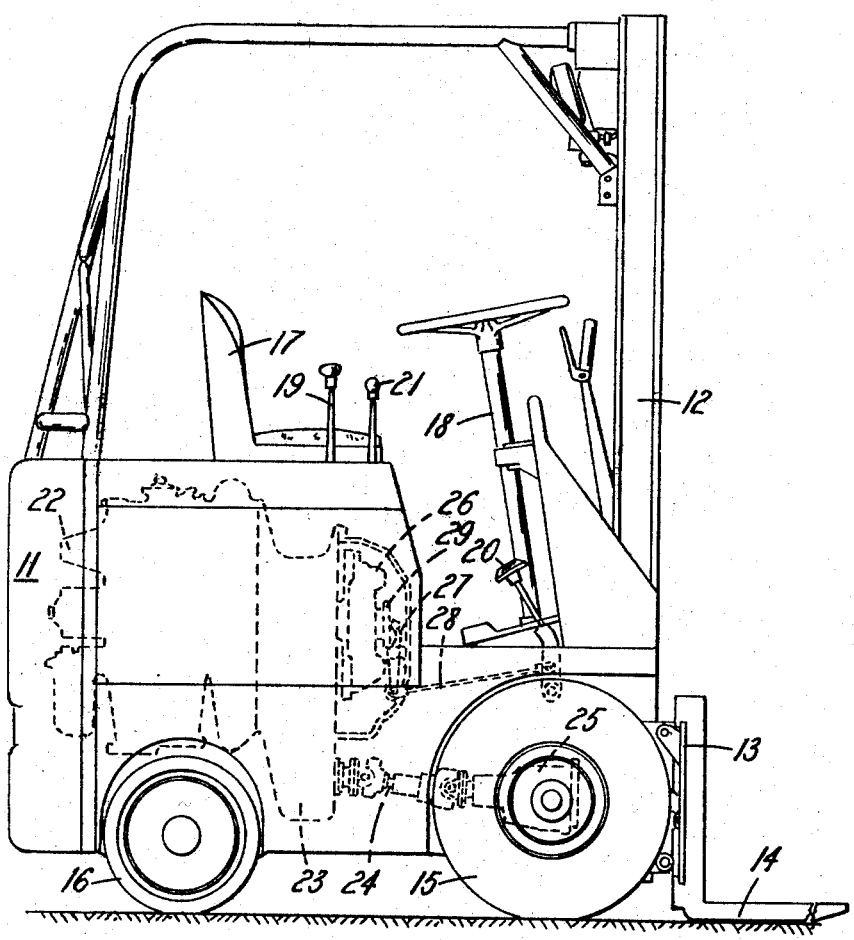
Figure 1 is a general outline view of a transmission in accordance with the invention.

Figure 1 shows the general outline of the truck which comprises a body 11 supporting at the front end a mast 12 on which runs a carriage 13 supporting fork arms 14. The truck has driving wheels 15 at the front and steering wheels 16 at the rear. On the body is a seat 17 for the driver, a steering column 18 connected by appropriate mechanism to the rear steering wheels 16, a gear lever 19 and a clutch pedal 20. The lever 21 is for controlling the raising and lowering of the fork-carriage 13.

Within the body 11 is a diesel engine 22 which is connected through a gear box 23 with a transmission shaft 24 leading to a differential casing 25 on the axle of the front wheels 15. The clutch is indicated at 26 and is operated by a clutch lever 27 through a clutch-operating rod 28 connected to the clutch pedal 20. Between the clutch lever 27 and the clutch is a thrust-race 29.

The gear box 23 and transmission shaft 24 driven thereby are shown in detail in Figure 2, but the clutch-operating lever 27 and thrust-race 29 are shown in this figure only in chain line, the parts being assumed to have been removed for the purpose of making the section. It will be appreciated that the clutch-operating lever 27 is supported by a rock shaft 127 pivoted to the front cover 30 of the clutch and that the lower end of the lever 27 is separate from the inner portion which bears on the thrust-race 29, being located on the end of the rock shaft outside the cover. One end of the engine crank shaft is indicated at 31 and this is secured to a stub shaft 32 which constitutes an engine drive member for the gear box and is supported in the side of the gear box in a ball bearing 33. Inside the gear box the drive member 32 carries a gear wheel 34. The clutch 26 is overhung from the gear box on the opposite side from the engine drive coupling 31, 32, and the member 26 of the clutch is formed in one piece with a hollow quill 35 which is supported in a ball bearing 36 in the gear casing 23. The gear casing 23 is provided with a face 37 for bolting to the engine crank case and the whole construction shown in Figure 2 is supported in this way from the engine 22.

The clutch member 26 and its quill 35 are co-axial with the engine shaft 31, and the member 26 is driven from the engine shaft through a hollow lay shaft 38 which at one end carries a gear 39 to mesh with the gear 34 on the driving member 32 and at the other end carries a gear 40 to mesh with a gear 41 on the quill 35. The lay shaft 38 is supported on a fixed spindle 42, which passes through it, by means of a ball bearing 43 at one end and a needle bearing 44 at the other. The spindle 42 is secured at its ends in the gear case 23.

The clutch member 26 constitutes one of the heavier elements of a single plate clutch. The clutch comprises a second driving element in the form of a ring 45 which is urged towards the member 26 by springs 46 at several places around its periphery. The members 26, 45, grip between them a driven clutch element 48 which consists of a thin metal plate provided with facings of frictional material 47 mounted on a hub 49. The hub 49 is splined to the end of a shaft 50 which extends into the gear box inside the quill 35 and is mounted on bearings therein. Inside the gear box the shaft 50 carries a sliding gear 51 having two sets of gear-teeth 52, 53, cut upon it and a groove 54 between the teeth 52, 53, to enable the member 51 to be operated by a fork in the usual way from the gear lever 19. The gear-teeth 52, 53 can be brought into mesh with teeth 55, 56, on an intermediate gear 57 and this in turn drives an idler 58 running on the fixed spindle 59 below the other gears and serving to drive a final gear 60 splined to a spindle 61 in the bottom of the gear box. The spindle 61 is connected by a flexible coupling 62 or by a universal joint to the transmission shaft 24. The front of the gear box below the clutch 26 carries a bracket 63 to which the clutch cover 30 is pivoted and the clutch cover is held up in front of the clutch by fixing set-screws 64 (one only shown) which enters the top of the gear box casing 23. As the clutch-operating lever 27 is pivoted on the casing 30, the release of the set-screws 64 enables the cover and the operating lever both to be hinged down together out of the way and displays the clutch mechanism, entirely free of interference from the transmission shafts in readiness for attention or relining whenever required. The upper part of the cover 30 is louvred as shown at 65.

It will be appreciated that the mechanism in the clutch for de-clutching by urging the ring 45 away from the clutch member 26 by inward movement of the thrust-race 29 is a well known construction and need not be described in detail. It comprises three clutch levers 66 supported from a cover plate 67 on studs 68, the outer ends of the levers bearing on a shoulder 69 inside the ring 45 by means of intermediate pressure bars 70 and the inner ends being engaged by the thrust race 29.

It will also be appreciated that the thrust race 29 can be operated by means other than that already described for example, a hydraulic ram controlled by the clutch pedal 20 could be used to replace the mechanical linkage 27, 28.

Referring to Figure 3, this shows only the front of the gear box 23 with the clutch parts removed and the spindles of the various gears also taken away. One object of this figure is to show a face 73 which is formed on one side of the gear box to take a cover. Removal of the cover from the face 73 permits access to the gears in the interior of the box to be obtained. The quill 35 operates in the aperture 74 in the cover, the spindle of the gears 57 fits in the aperture 75, the spindle 59 fits in the aperture 76 and the shaft 61 has its bearings in the aperture 77. The bracket 63 is supported by feet which rest on bosses 78, 79 formed on the front of the gear box and a reversing gear has its bearings in the aperture 80.

The engine shaft 31 need not be connected to the gear box drive coaxially with the axis of the clutch 26 as previously described. For example, the engine shaft 31 could be directly coupled to the shaft 38 or its equivalent, as shown in Figure 4, thus obviating the use of gears 34 and 39. In this case the axis of the shaft 38 is lowered to that of the engine shaft and the idler gear 58 can be dispensed with.

I claim:

1. A transmission assembly for a vehicle comprising a gear box, an engine drive coupling on one side of the gear box, a friction clutch overhung from the gear box on the other side from the engine drive coupling, the clutch having a rotatable driving friction member and a rotatably-driven friction member, means to urge the two members into engagement with one another and means to move them apart, the driving friction member of the clutch being mounted on a hollow quill supported by the gear box and the driven member on a shaft which extends into the gear box through the quill, operative connections between the drive coupling and the quill to convey engine power to the quill and thence to the clutch member mounted thereon and gears in the gear box connecting the shaft on which the driven member of the clutch is mounted to a final gear box drive located on a different axis from the axis of the quill.

2. A transmission assembly as claimed in claim 1 wherein the rotatably-driven friction member consists of a light disk and the driving friction member comprises flat-faced annular friction faces adapted to engage the disk on both faces thereof.

3. A transmission assembly as claimed in claim 1, wherein the gear box is mounted on the front of an engine, the gears consist of a train which extends downwardly from the engine shaft to the final gear-box drive shaft which is located in the bottom of the gear box, and the final gear box drive is connected by a transmission shaft to a differential drive for a pair of vehicle driving wheels.

4. A transmission assembly as claimed in claim 1, wherein a clutch-operating member is provided which is mounted on a clutch cover plate removably secured in front of and so as to enclose the overhung clutch parts, whereby removal of the cover plate automatically removes the clutch-operating member.

5. A transmission assembly as claimed in claim 4, wherein the cover plate is hinged at one side to the front of the gear box and is secured at the other side to the gear box by a readily detachable fastening.

References Cited in the file of this patent
FOREIGN PATENTS
745,078    Germany _____ Feb. 25, 1944